(12) United States Patent
Uno

(10) Patent No.: US 11,028,859 B2
(45) Date of Patent: Jun. 8, 2021

(54) AIR SUPPLY AND EXHAUST DEVICE FOR AIR CELLS

(71) Applicant: TOYOTA BOSHOKU KABUSHIKI KAISHA, Aichi-ken (JP)

(72) Inventor: Yosuke Uno, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 268 days.

(21) Appl. No.: 16/417,141

(22) Filed: May 20, 2019

(65) Prior Publication Data
US 2019/0353184 A1 Nov. 21, 2019

(30) Foreign Application Priority Data

May 21, 2018 (JP) .............................. JP2018-097039

(51) Int. Cl.
*A47C 7/02* (2006.01)
*B60N 2/56* (2006.01)
*F04D 29/66* (2006.01)

(52) U.S. Cl.
CPC ......... *F04D 29/667* (2013.01); *B60N 2/5642* (2013.01); *B60N 2/5657* (2013.01)

(58) Field of Classification Search
CPC .... B60N 2/5642; B60N 2/5657; B60N 2/914; F04D 29/667
USPC .......................................... 297/284.3–284.6
See application file for complete search history.

(56) References Cited

U.S. PATENT DOCUMENTS

| | | | | |
|---|---|---|---|---|
| 5,893,609 A * | 4/1999 | Schmidt | ................ | B60N 2/914 |
| | | | | 297/284.6 |
| 6,086,041 A * | 7/2000 | Gattuso | ................ | B60N 2/0232 |
| | | | | 251/129.06 |
| 6,273,810 B1 * | 8/2001 | Rhodes, Jr. | ............... | A47C 4/54 |
| | | | | 454/120 |
| 6,682,059 B1 * | 1/2004 | Daniels | .................... | A47C 4/54 |
| | | | | 267/131 |
| 8,616,654 B2 * | 12/2013 | Zenk | ...................... | B60N 2/914 |
| | | | | 297/452.41 |
| 9,642,469 B2 * | 5/2017 | Savicki | ................ | A47C 27/082 |
| 9,889,773 B2 * | 2/2018 | Line | ........................ | B60N 2/68 |
| 10,899,262 B2 * | 1/2021 | Wheeler | .................. | B60N 2/99 |
| 10,948,098 B2 * | 3/2021 | Pfahler | ................ | F16K 31/025 |

(Continued)

FOREIGN PATENT DOCUMENTS

JP 2016-223436 12/2016

*Primary Examiner* — Shin H Kim
(74) *Attorney, Agent, or Firm* — Greenblum & Bernstein, P.L.C.

(57) ABSTRACT

There is provided an air supply and exhaust device for air cells which is configured to supply air to a plurality of air cells and exhaust air from the plurality of air cells via a distributor. The distributor includes a housing having a plurality of vent holes and a valve body including an air supply chamber and an exhaust passage. The exhaust passage has a cross-sectional area substantially the same as a cross-sectional area of a vent hole capable of communicating with the exhaust passage, and allows an exhaust receiving port configured to face the vent hole capable of communicating with the exhaust passage and an atmosphere opening port to communicate with each other by being curved around a rotation center of the valve body and extending in a circular arc shape along a rotation track of the valve body at least at the exhaust receiving port.

5 Claims, 6 Drawing Sheets

(56) References Cited

U.S. PATENT DOCUMENTS

| | | | | |
|---|---|---|---|---|
| 2003/0038517 | A1* | 2/2003 | Moran | B60N 2/914 |
| | | | | 297/284.3 |
| 2009/0099490 | A1* | 4/2009 | Durt | B60N 2/986 |
| | | | | 601/115 |
| 2010/0244504 | A1* | 9/2010 | Colja | A61H 9/0078 |
| | | | | 297/180.1 |
| 2012/0086249 | A1* | 4/2012 | Hotary | B60N 2/838 |
| | | | | 297/284.3 |
| 2016/0348670 | A1* | 12/2016 | Sakohira | F04B 49/22 |
| 2019/0353184 | A1* | 11/2019 | Uno | B60N 2/5657 |

\* cited by examiner

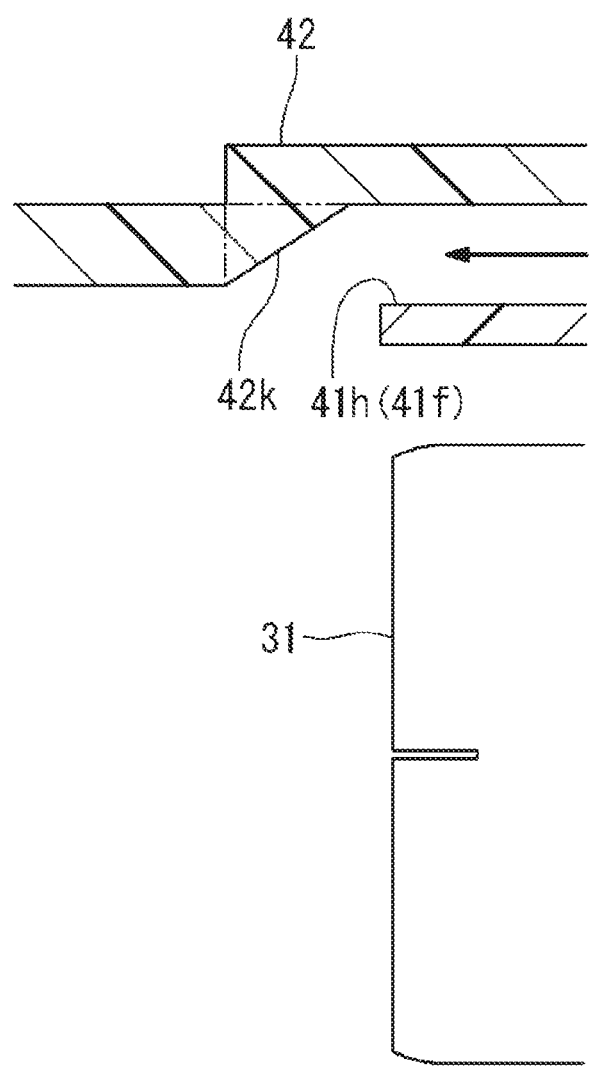

AIR SUPPLY AND EXHAUST DEVICE FOR AIR CELLS

CROSS-REFERENCE TO RELATED APPLICATIONS

This application claims priority from Japanese Patent Application No. 2018-097039 filed on May 21, 2018, the entire contents of which are incorporated herein by reference.

TECHNICAL FIELD

The present disclosure relates to an air supply and exhaust device for air cells which is configured to supply air to and exhaust air from the air cells equipped in a massage device or the like.

BACKGROUND ART

In some automobiles, a massage device has been developed, which sequentially supplies air to and exhausts air from a plurality of air cells equipped in a seat via a distributor, and massages body of a seated occupant (see JP-A-2016-223436). By the distributor of such a massage device, the air is supplied from a pump to a vent hole corresponding to an air cell to be inflated, and is exhausted from a vent hole corresponding to an air cell to be deflated by opening the vent hole to atmospheric pressure.

A flow passage of exhausting the air from the air cell is formed by enabling the vent hole communicating with the air cell to communicate with an exhaust chamber of the distributor. The exhaust chamber is formed to spread so as to be able to simultaneously communicate with a plurality of vent holes. Therefore, when the exhausted air flows into the exhaust chamber from the vent holes, turbulence and vortex in the air flow are generated, and noise is also generated.

SUMMARY

An object of the disclosure is to prevent generation of turbulence and vortex in the air flow in an exhaust passage of the air cell in the air supply and exhaust device for air cells. Thereby, noise during air exhaust is reduced.

According to an aspect of the disclosure, there is provided an air supply and exhaust device for air cells, which is configured to supply air to a plurality of air cells and exhaust air from the plurality of air cells via a distributor, the plurality of air cells being inflatable and deflatable, the air supply and exhaust device including: the distributor including: a housing having a plurality of vent holes that respectively communicate with the air cells; and a valve body configured to be rotatably driven in a state of being arranged to face the vent holes of the housing, configured to supply air from a pump to a vent hole communicating with an air cell to be inflated, and configured to exhaust air from a vent hole communicating with an air cell to be deflated, wherein the valve body includes: an air supply chamber configured to supply the air from the pump to a vent hole facing the air supply chamber among the plurality of vent holes of the housing; and an exhaust passage through which an air cell communicating with a vent hole facing the exhaust passage among the plurality of vent holes of the housing communicates with an atmosphere opening port, and wherein the exhaust passage has a cross-sectional area substantially the same as a cross-sectional area of the vent hole capable of communicating with the exhaust passage, and allows an exhaust receiving port configured to face the vent hole capable of communicating with the exhaust passage and the atmosphere opening port to communicate with each other by being curved around a rotation center of the valve body and extending in a circular arc shape along a rotation track of the valve body at least at the exhaust receiving port.

Accordingly, the air is exhausted from the air cell from the atmosphere opening port through the vent hole and the exhaust passage. During this time, the cross-sectional area of the exhaust passage hardly changes, and the number of bent portions is also reduced. Therefore, for example, generation of turbulence and vortex in the exhaust passage can be prevented, and noise during air exhaust can be reduced.

BRIEF DESCRIPTION OF DRAWINGS

FIG. 8 is an enlarged sectional view taken along a line VIII-VIII in FIG. 6.

DETAILED DESCRIPTION

\<Configuration of Embodiment (Bladder 63)\>

Figure 1:
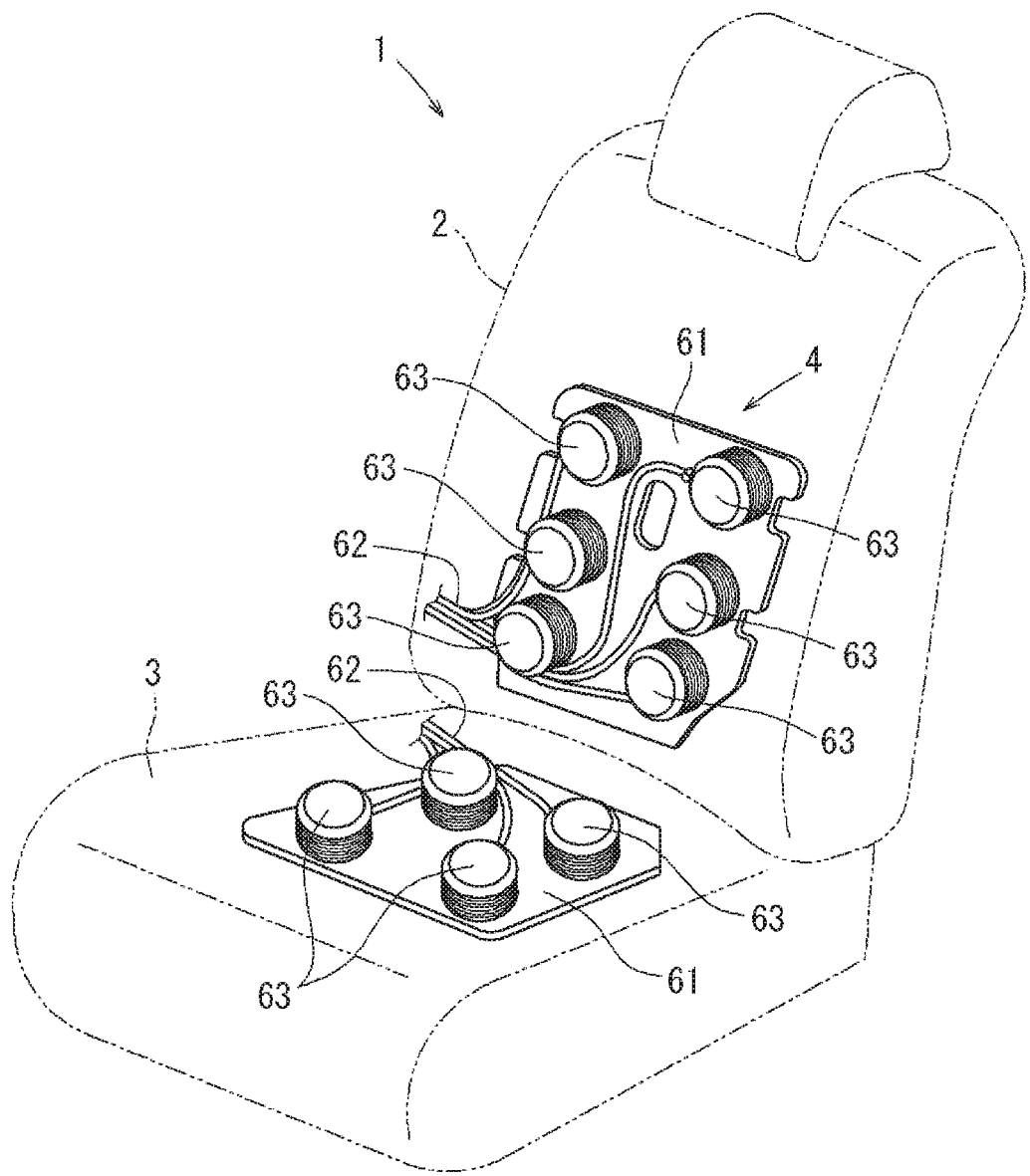
FIG. 1 is an external perspective view of a massage device to which an embodiment of the disclosure is applied.

FIG. 1 illustrates a massage device 4 to which an air supply and exhaust device for air cells according to an embodiment of the disclosure is applied. The massage device 4 is applied to an automobile seat (hereinafter, simply referred to as a seat) 1.

The seat 1 includes a seat back 2 serving as a backrest and a seat cushion 3 serving as a seat portion, and a plurality of bladders (corresponding to air cells of the disclosure) 63 are arranged along seating surfaces of the seat back 2 and the seat cushion 3. In this case, pairs of bladders 63 are provided in a horizontal direction on boards 61 fixed in the seat back 2 and the seat cushion 3. Three pairs of bladders 63 are provided in a vertical direction of the seat back 2, and two pairs of bladders 63 are provided in a front and rear direction of the seat cushion 3. Thereby, ten bladders 63 are provided in total. The pair of bladders 63 in the horizontal direction supply and exhaust air as a set. For example, air supply and exhaust are sequentially performed on bladders 63 from a lower side to an upper side of the seat back 2, and back of the occupant is massaged. In addition, air supply and exhaust are sequentially performed on bladders 63 from a front side to a rear side of the seat cushion 3, and portions from buttocks to thighs of the occupant are massaged. The massage device 4 is said to be a five-channel massage device since five pairs (sets) of bladders 63 are provided. However, the massage device 4 is not limited to a five-channel type, and may be a three-channel type applied only to the seat back 2, or may be a two-channel type applied only to the seat cushion 3.

\<Configuration of Embodiment (Distributor 20)\>

Figure 2:
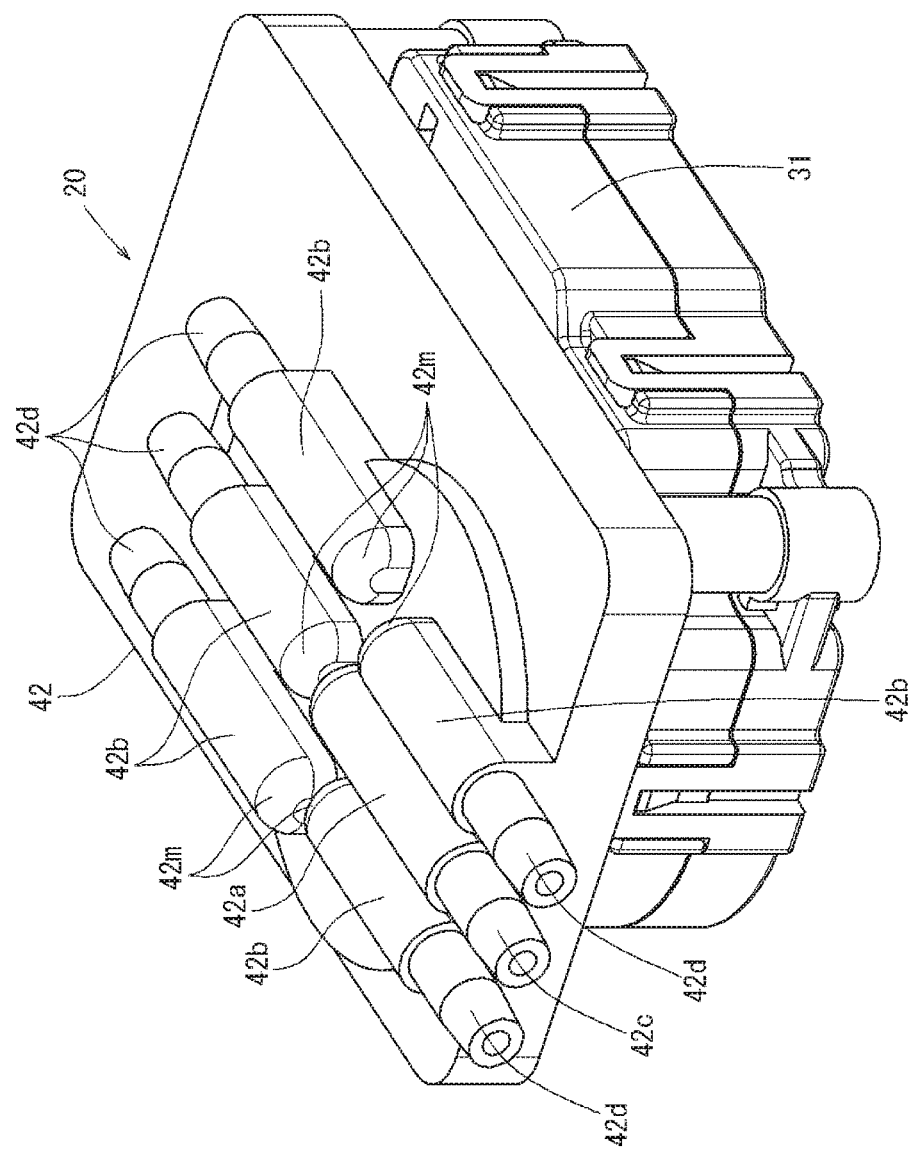
FIG. 2 is an external perspective view of a distributor according to the embodiment.

FIGS. 2 to 6 illustrate a distributor 20 of the massage device 4. As illustrated in FIG. 2, the distributor 20 is provided with one connection pipe 42*a* and five connection pipes 42b. A pump (not illustrated) is connected to a tip portion 42c of the connection pipe 42a, and each of the five sets of bladders 63 illustrated in FIG. 1 is connected to a tip portion 42d of the connection pipe 42b via a hose 62. Accordingly, as the distributor 20 is operated, air supplied from the pump to the connection pipe 42a is sequentially supplied to the bladders 63 via the connection pipes 42b respectively, so that the bladders 63 are sequentially inflated.

Figure 3:
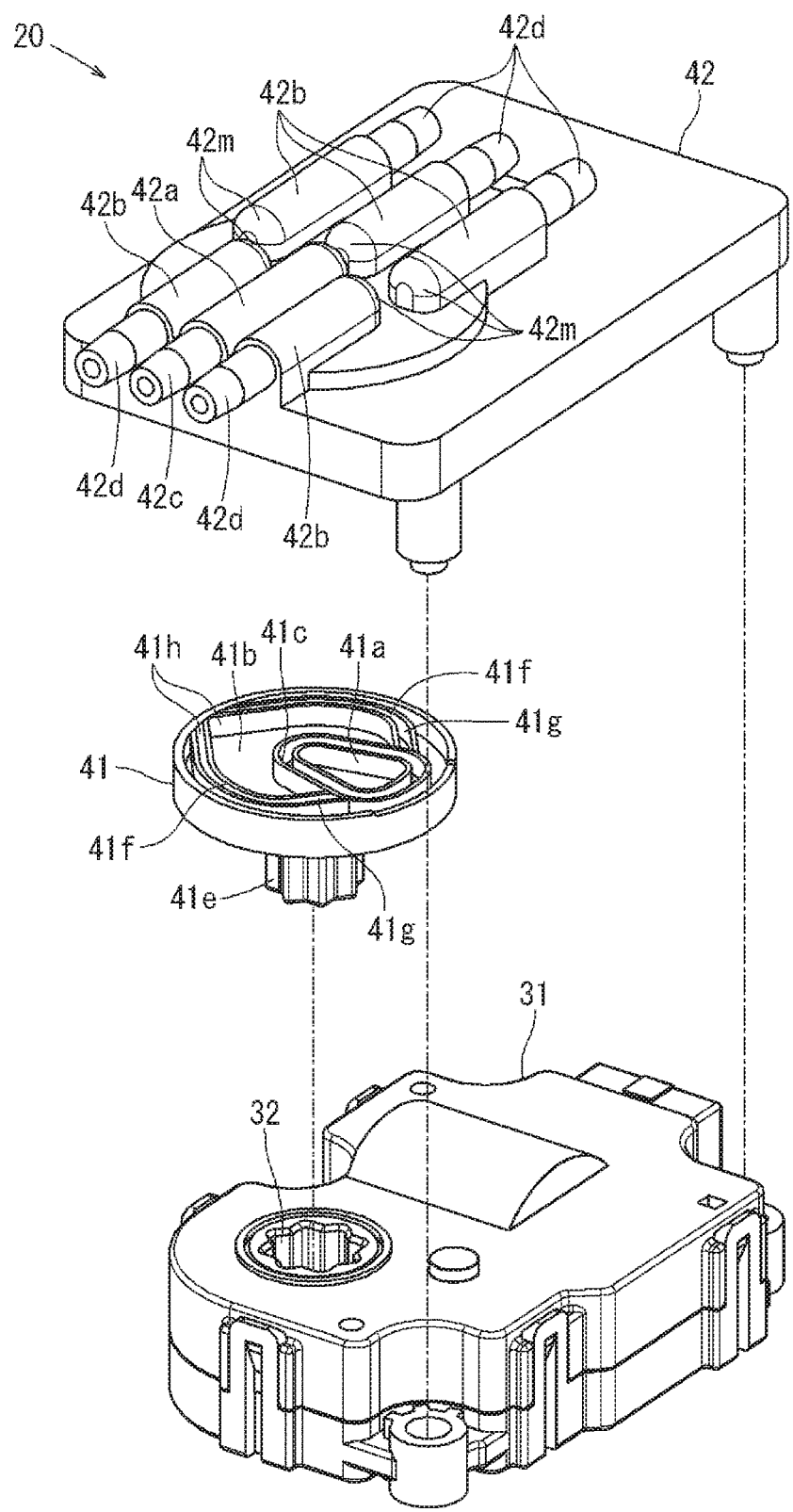
FIG. 3 is an exploded perspective view of the distributor.
Figure 4:
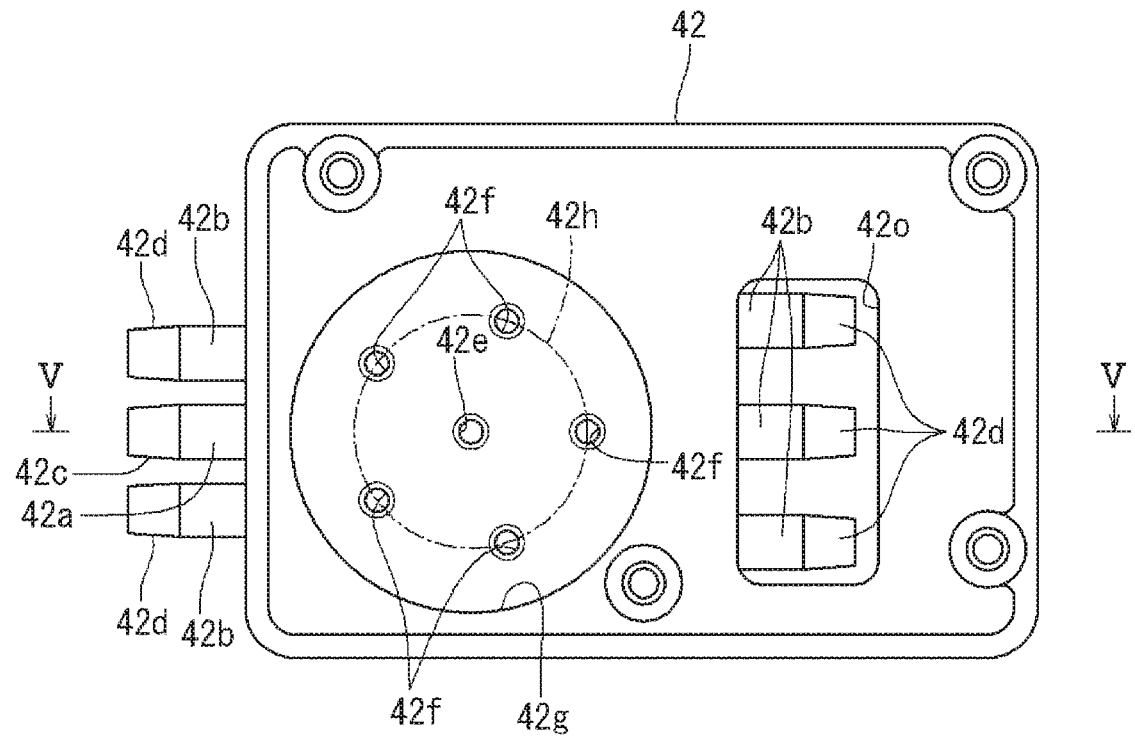
FIG. 4 is a bottom view of a housing in the distributor.

As illustrated in FIG. 3, the distributor 20 roughly includes three components: a motor assembly 31, a valve body 41 and a housing 42. Although illustration of an internal configuration is omitted here, the motor assembly 31 is configured to accommodate a motor, a speed reducer and an output shaft 32 in one casing. The valve body 41 is a rotation body like a circular container, and a rotation shaft 41e at a center of a circular shape is coupled to the output shaft 32 of the motor assembly 31 so as to be rotatably driven. Here, a rotation direction of the valve body 41 can be reversed forward or backward by reversing a rotation direction of the motor. Further, as illustrated in FIGS. 4 and 5, the housing 42 receives an opening side upper surface of the valve body 41 in a circular recess 42g formed on a lower surface, and the upper surface of the valve body 41 is arranged to face the lower surface of the recess 42g.

The connection pipes 42a and 42b are integrally formed on an opposite side surface of the recess 42g of the housing 42. The connection pipe 42a is opened at a center of the circular recess 42g to form an air supply vent hole 42e. The connection pipes 42b are opened at equal intervals on a virtual concentric circle 42h around the air supply vent hole 42e of the recess 42g to form air cell vent holes 42f.

Figure 5:
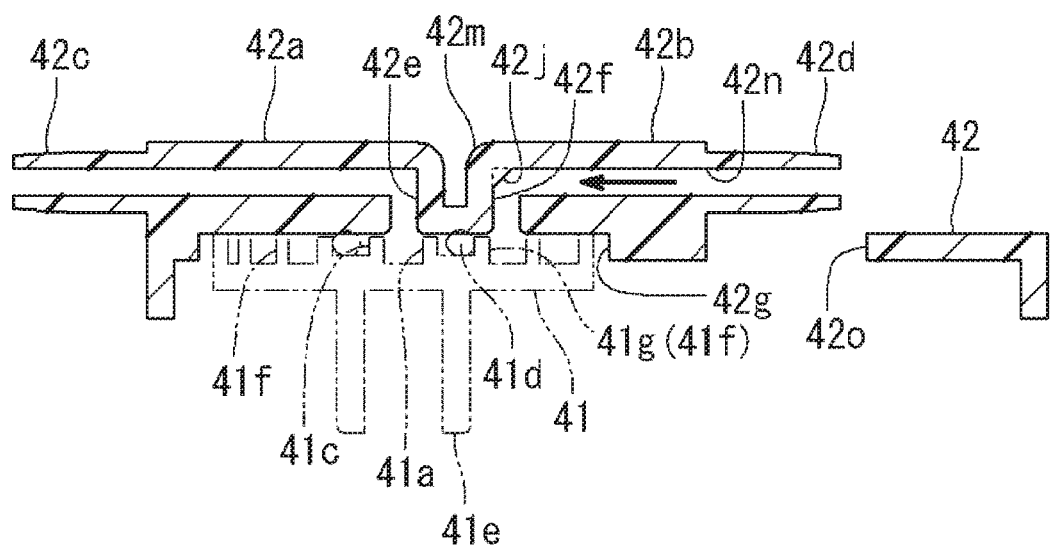
FIG. 5 is a sectional view taken along a line V-V in FIG. 4.
Figure 6:
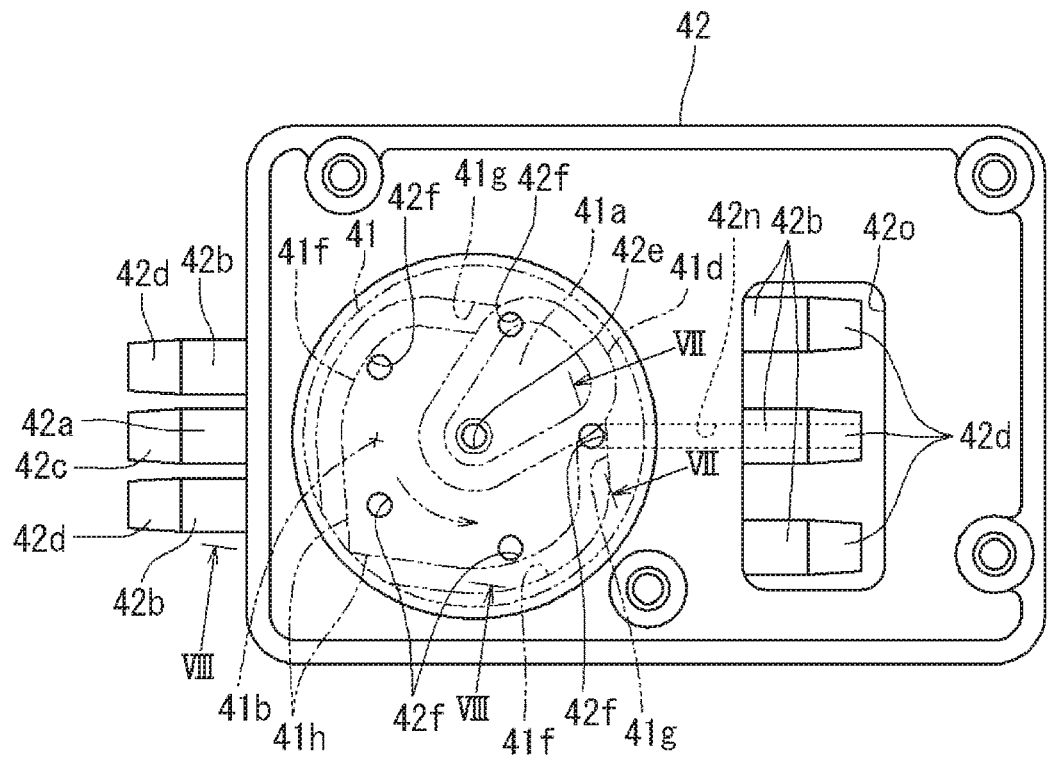
FIG. 6 is an explanatory view illustrating operation of the distributor.

As illustrated in FIGS. 3, 5 and 6, the upper surface of the valve body 41 is divided into three regions by vertical walls in the circular container. When the valve body 41 is received in the recess 42g of the housing 42, one region is in a position capable of communicating with the air supply vent hole 42e and the air cell vent hole 42f to form an air supply chamber 41a. The air supply chamber 41a always communicates with the air supply vent hole 42e, and sequentially communicates with the air cell vent holes 42f in accordance with rotation of the valve body 41. The air supply chamber 41a has a fan shape extending from a center of the upper surface of the valve body 41 to an outer peripheral side. The air supply vent hole 42e corresponds to a center portion of the fan shape, and the air cell vent holes 42f correspond to peripheral portions of the fan shape.

Another region is arranged so as to surround outside of the air supply chamber 41a, and forms a groove 41c. Still another region is a region other than the air supply chamber 41a and the groove 41c, and forms an air exhaust chamber 41b. An O-ring 41d is fitted into the groove 41c, and space between the air supply chamber 41a and the exhaust chamber 41b is sealed in an airtight manner when the valve body 41 is received in the recess 42g of the housing 42. Areas of the air supply chamber 41a and the exhaust chamber 41b are set such that the plurality of air cell vent holes 42f does not simultaneously communicate with the air supply chamber 41a regardless of a rotation position of the valve body 41.

The exhaust chamber 41b is provided with a pair of exhaust passages 41f therein. The exhaust passage 41f is a groove whose side facing the lower surface of the housing 42 is opened, and is formed to be curved around a rotation center of the valve body 41 substantially along a circular inner peripheral surface of the valve body 41. An exhaust receiving port 41g at one end of each exhaust passage 41f is in close contact with the groove 41c, and a position thereof corresponds to a position on a circular arc along a rotation track of the valve body 41 where each air cell vent hole 42f passes when the valve body 41 is rotated.

An atmosphere opening port 41h at the other end of each exhaust passage 41f is coupled to the circular inner peripheral surface of the valve body 41 at a position substantially facing the air supply chamber 41a. A through hole (not illustrated) is formed in a wall surface of the valve body 41 corresponding to the atmosphere opening port 41h. Therefore, the air exhausted from the atmosphere opening port 41h is discharged into an inner space of the housing 42 through the through hole. As illustrated in FIG. 4, an opening 42o is formed at a portion adjacent to the recess 42g of the housing 42, and the air exhausted from the atmosphere opening port 41h into the space in the housing 42 is discharged into atmosphere via the opening 42o.

As illustrated in FIG. 6, a portion between the exhaust receiving port 41g and the atmosphere opening port 41h of each exhaust passage 41f is arranged corresponding to an outer peripheral side of the virtual concentric circle 42h where the air cell vent holes 42f are located. A cross-sectional area of each exhaust passage 41f is substantially the same as a cross-sectional area of each air cell vent holes 42f.

As illustrated by an arrow of an imaginary line in FIG. 6, the valve body 41 is rotated counterclockwise. FIG. 6 shows a state immediately after the air cell bent hole 42f at a position corresponding to the air supply chamber 41a enters a position corresponding to the exhaust receiving port 41g of the exhaust passage 41f. In this state, as illustrated by an arrow in FIG. 7, the air that had inflated the bladder 63 until then flows from a vent passage 42n of the connection pipe 42b to the exhaust receiving port 41g of the exhaust passage 41f and is exhausted.

At this time, as illustrated by an arrow in FIG. 5, the air from the vent passage 42n of the connection pipe 42b toward the air cell vent hole 42f is bent at a bent portion 42m of the connection pipe 42b. In this case, an outer peripheral side inner wall surface of the bent portion 42m is formed as an inclined surface 42j. Therefore, the air flowing through the bent portion 42m is a laminar flow along the wall surface of the inclined surface 42j. As illustrated by an imaginary line in FIG. 5, when the inner wall surface of the bent portion 42m is a bent and recessed surface, the air flowing through the bent portion 42m forms a bent and circling flow at the bent and recessed surface where turbulence and vortex are generated. Therefore, by forming the inner wall surface of the bent portion 42m as the inclined surface 42j, generation of turbulence and vortex can be prevented, and noise at the bent portion 42m accompanying air exhaust from the bladder 63 can be reduced.

In addition, as illustrated in FIG. 5, the air flowing into the exhaust receiving port 41g of the exhaust passage 41f through the air cell vent hole 42f has a cross-sectional area of substantially the same size as that of the air cell vent hole 42f and the exhaust receiving port 41g, so that the air flowing into the exhaust receiving port 41g from the air cell vent hole 42f is not disturbed, thereby reducing noise. According to related art where the air from the air cell vent hole 42f is diffused into the exhaust chamber 41b without the exhaust passage 41f, turbulence and vortex are generated in the air flowing into the exhaust chamber 41b, thereby generating noise.

Figure 7:
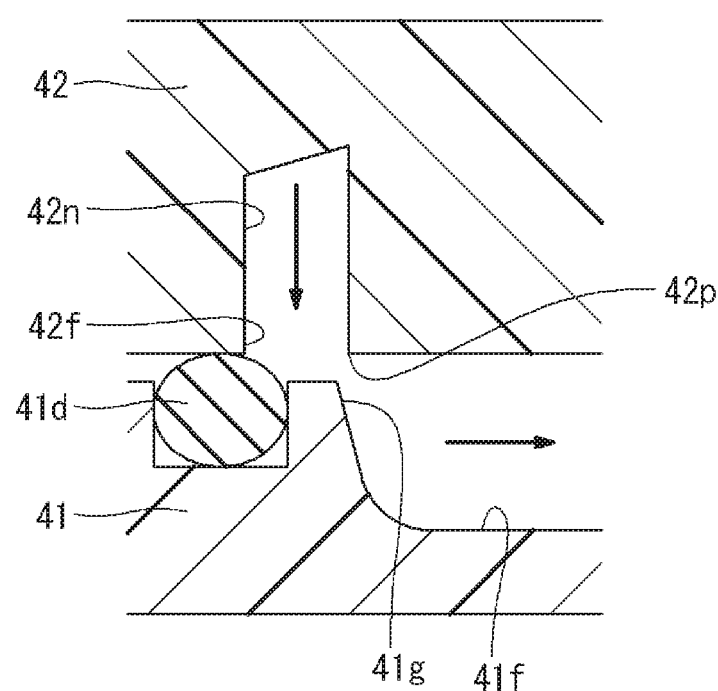
FIG. 7 is an enlarged sectional view taken along a line VII-VII in FIG. 6.

Further, as illustrated in FIG. 7, a chamfering amount at an opening end portion 42p of the air cell vent hole 42f is smaller than a chamfering amount at an opening end portion of the air supply vent hole 42e. Therefore, the air flowing from the air cell vent hole 42f toward the exhaust receiving port 41g of the exhaust passage 41f is prevented from leaking to the side by chamfering the air cell vent hole 42f, and flows linearly. Therefore, generation of turbulence and vortex due to the flow leaking to the side can be prevented, and noise can be reduced.

When the valve body 41 is further rotated counterclockwise from the state illustrated in FIG. 6, the air cell vent hole 42f corresponding to the exhaust receiving port 41g of the exhaust passage 41f eventually comes into a state where the air cell vent hole 42f corresponding to the exhaust receiving port 41g does not correspond to the exhaust passage 41f. In this state, the air cell vent hole 42f does not correspond to the exhaust passage 41f, but corresponds to the exhaust chamber 41b. Since the exhaust chamber 41b is connected to the space in the housing 42 through a gap between the recess 42g of the housing 42 and the valve body 41, the air exhaust from the bladder 63 can be continued even if the air remains in the bladder 63.

When the rotation direction of the valve body 41 is clockwise, the air is similarly exhausted from the bladder 63 through the other exhaust passage 41f provided in a symmetrical manner.

FIG. 8 illustrates an atmosphere opening port 41h of the exhaust passage 41f. A wall surface of the housing 42, which faces the atmosphere opening port 41h and to which the air exhausted from the exhaust passage 41f is blown, is formed by an inclined surface 42k. Therefore, the blown air is a laminar flow along the wall surface of the inclined surface 42k. As illustrated by imaginary lines in FIG. 8, when the wall surface of the housing 42 is a bent and recessed surface, the air exhausted from the exhaust passage 41f forms a bent and circling flow at the bent and recessed surface that is the wall surface of the housing 42, thereby generating turbulence and vortex. Therefore, by forming the wall surface of the housing 42 as the inclined surface 42k, generation of turbulence and vortex can be prevented and noise at the atmosphere opening port 41h portion accompanying the air exhaust from the bladder 63 can be reduced.

Operation of Embodiment

When the pump and the distributor 20 are operated, air from the pump is supplied to the air supply chamber 41a via the connection pipe 42a of the distributor 20. The air cell vent holes 42f of the connection pipes 42b sequentially communicate with the air supply chamber 41a in accordance with the rotation of the valve body 41. The air in the air supply chamber 41a is supplied to the air cell vent holes 42f communicating with the air supply chamber 41a, and is supplied to the bladders 63 via the connection pipes 42b respectively. When the air cell vent holes 42f of the connection pipes 42b communicate with the exhaust receiving port 41g of the exhaust passage 41f in accordance with the rotation of the valve body 41, the air is exhausted from the bladders 63 communicating with the connection pipes 42b. In this way, air is sequentially supplied to and exhausted from the bladders 63, and massage operation is performed.

Effect of Embodiment

The air is exhausted from the bladders 63 from the atmosphere opening port 41h through the air cell vent holes 42f and the curved exhaust passage 41f. During this time, the cross-sectional area of the exhaust passage 41f is substantially equal to the cross-sectional area of the air cell vent holes 42f. The exhaust passage 41f is curved along the circular inner peripheral surface of the valve body 41 without having a bent portion. Therefore, the cross-sectional area of the exhaust passage hardly changes, and the number of bent portions is also reduced. Therefore, turbulence in the air flow such as generation of turbulence and vortex during the air exhaust is prevented. Therefore, noise during the air exhaust can be reduced.

Other Embodiments

Although a specific embodiment have been described above, the disclosure is not limited to those appearances and configurations, and various modifications, additions and deletions may be made. For example, although the disclosure is applied to an air supply and exhaust device for bladders for a massage device in the above embodiment, the disclosure may be applied to an air supply and exhaust device for air cells used as an actuator for other purposes, such as a lumbar support of a vehicle seat. Although the disclosure is applied to the massage device for an automobile in the above embodiment, the disclosure may be applied to a massage dedicated seat.

The disclosure provides illustrative, non-limiting examples as follows:

According to a first aspect of the disclosure, there is provided an air supply and exhaust device for air cells, which is configured to supply air to a plurality of air cells and exhaust air from the plurality of air cells via a distributor, the plurality of air cells being inflatable and deflatable, the air supply and exhaust device including: the distributor including: a housing having a plurality of vent holes that respectively communicate with the air cells; and a valve body configured to be rotatably driven in a state of being arranged to face the vent holes of the housing, configured to supply air from a pump to a vent hole communicating with an air cell to be inflated, and configured to exhaust air from a vent hole communicating with an air cell to be deflated, wherein the valve body includes: an air supply chamber configured to supply the air from the pump to a vent hole facing the air supply chamber among the plurality of vent holes of the housing: and an exhaust passage through which an air cell communicating with a vent hole facing the exhaust passage among the plurality of vent holes of the housing communicates with an atmosphere opening port, and wherein the exhaust passage has a cross-sectional area substantially the same as a cross-sectional area of the vent hole capable of communicating with the exhaust passage, and allows an exhaust receiving port configured to face the vent hole capable of communicating with the exhaust passage and the atmosphere opening port to communicate with each other by being curved around a rotation center of the valve body and extending in a circular arc shape along a rotation track of the valve body at least at the exhaust receiving port.

According to the first aspect of the disclosure, the air is exhausted from the air cell from the atmosphere opening port through the vent hole and the exhaust passage. During this time, the cross-sectional area of the exhaust passage hardly changes, and the number of bent portions is also reduced. Therefore, for example, generation of turbulence and vortex in the exhaust passage can be prevented, and noise during air exhaust can be reduced.

According to a second aspect of the disclosure, there is provided the air supply and exhaust device for air cells according to the first aspect, wherein the valve body is rotatable forward and backward, and wherein a pair of exhaust passages is provided in a symmetrical manner on both sides of the air supply chamber in a rotation direction of the valve body.

According to the second aspect of the disclosure, the distributor is provided with the pair of exhaust passages therein. Therefore, the distributor can be commonly used even when the rotation direction of the valve body is different. In addition, the exhaust passages are symmetrically arranged in the rotation direction within the valve body. Therefore, moment of inertia during rotation of the valve body can be prevented from becoming unbalanced due to a rotation angle, and the rotation can be stabilized. Accordingly, by stabilizing the rotation of the valve body, uneven wear of the valve body and the adjacent housing can be prevented even in long-term use.

According to a third aspect of the disclosure, there is provided the air supply and exhaust device for air cells according to the first or second aspect, wherein the housing includes, for each air cell, a connection pipe configured to communicate with each air cell via a hose, wherein a vent passage through which the connection pipe and the vent hole communicates has a bent portion, and wherein an outer peripheral side inner wall surface of a bent part of the bent portion is formed as an inclined surface capable of preventing a circuitous flow at the bent portion when the air flows from the connection pipe toward the vent hole through the bent portion.

According to the third aspect of the disclosure, when the air exhausted from the air cell flows through the bent portion of the vent passage, the air flows along the inclined surface. Therefore, generation of turbulence and vortex due to the circuitous air flow at the bent portion is prevented. Therefore, noise due to the exhausted air flowing through the bent portion can be reduced.

According to a fourth aspect of the disclosure, there is provided the air supply and exhaust device for air cells according to any one of the first to third aspects, wherein the plurality of vent holes includes an air supply vent hole which is configured to introduce the air from the pump into the air supply chamber of the valve body, and wherein a chamfering amount of an opening end portion of the vent hole facing the exhaust passage is smaller than a chamfering amount of an opening end portion of the air supply vent hole so that the air from the vent hole facing the exhaust passage flows linearly toward the exhaust passage, thereby preventing turbulence due to flow of the air from the vent hole facing the exhaust passage leaking to the side.

According to the fourth aspect of the disclosure, the exhausted air flowing from the vent hole toward the exhaust passage is prevented from leaking to the side by chamfering the vent hole, and flows linearly. Therefore, generation of turbulence and vortex due to the flow leaking to the side can be prevented, and noise can be reduced.

According to a fifth aspect of the disclosure, there is provided the air supply and exhaust device for air cells according to any one of the first to fourth aspects, wherein a wall surface of the housing, which faces the atmosphere opening port of the exhaust passage and to which the air exhausted from the exhaust passage is blown, is formed as an inclined surface configured to prevent a flow of the blown air from bending and circling along the wall surface.

According to the fifth aspect, the air blown from the exhaust passage to the wall surface of the housing flows along the inclined surface, and the flow is prevented from bending and circling. Therefore, generation of turbulence and vortex due to the bending and circling flow can be prevented, and noise can be reduced.

What is claimed is:

1. An air supply and exhaust device for air cells, which is configured to supply air to a plurality of air cells and exhaust air from the plurality of air cells via a distributor, the plurality of air cells being inflatable and deflatable, the air supply and exhaust device comprising:
   the distributor including:
      a housing having a plurality of vent holes that respectively communicate with the air cells; and
      a valve body configured to be rotatably driven in a state of being arranged to face the vent holes of the housing, configured to supply air from a pump to a vent hole communicating with an air cell to be inflated, and configured to exhaust air from a vent hole communicating with an air cell to be deflated,
   wherein the valve body includes:
      an air supply chamber configured to supply the air from the pump to a vent hole facing the air supply chamber among the plurality of vent holes of the housing; and
      an exhaust passage through which an air cell communicating with a vent hole facing the exhaust passage among the plurality of vent holes of the housing communicates with an atmosphere opening port, and
   wherein the exhaust passage has a cross-sectional area substantially the same as a cross-sectional area of the vent hole capable of communicating with the exhaust passage, and allows an exhaust receiving port configured to face the vent hole capable of communicating with the exhaust passage and the atmosphere opening port to communicate with each other by being curved around a rotation center of the valve body and extending in a circular arc shape along a rotation track of the valve body at least at the exhaust receiving port.

2. The air supply and exhaust device for air cells according to claim 1,
   wherein the valve body is rotatable forward and backward, and
   wherein a pair of exhaust passages is provided in a symmetrical manner on both sides of the air supply chamber in a rotation direction of the valve body.

3. The air supply and exhaust device for air cells according to claim 1,
   wherein the housing includes, for each air cell, a connection pipe configured to communicate with each air cell via a hose,
   wherein a vent passage through which the connection pipe and the vent hole communicates has a bent portion, and
   wherein an outer peripheral side inner wall surface of a bent part of the bent portion is formed as an inclined surface capable of preventing a circuitous flow at the bent portion when the air flows from the connection pipe toward the vent hole through the bent portion.

4. The air supply and exhaust device for air cells according to claim 1,
   wherein the plurality of vent holes includes an air supply vent hole which is configured to introduce the air from the pump into the air supply chamber of the valve body, and
   wherein a chamfering amount of an opening end portion of the vent hole facing the exhaust passage is smaller than a chamfering amount of an opening end portion of the air supply vent hole so that the air from the vent hole facing the exhaust passage flows linearly toward the exhaust passage, thereby preventing turbulence due to flow of the air from the vent hole facing the exhaust passage leaking to the side.

5. The air supply and exhaust device for air cells according to claim 1,
wherein a wall surface of the housing, which faces the atmosphere opening port of the exhaust passage and to which the air exhausted from the exhaust passage is blown, is formed as an inclined surface configured to prevent a flow of the blown air from bending and circling along the wall surface.

* * * * *